(12) United States Patent
Bouwkamp

(10) Patent No.: US 7,775,544 B2
(45) Date of Patent: Aug. 17, 2010

(54) PIN BOX ASSEMBLY

(75) Inventor: Philip M. Bouwkamp, Bristol, IN (US)

(73) Assignee: Dexter Axle Company, Elkhart, IN (US)

( * ) Notice: Subject to any disclaimer, the term of this patent is extended or adjusted under 35 U.S.C. 154(b) by 246 days.

(21) Appl. No.: 11/809,261

(22) Filed: May 31, 2007

(65) Prior Publication Data
US 2008/0296868 A1    Dec. 4, 2008

(51) Int. Cl.
*B60D 1/50* (2006.01)
(52) U.S. Cl. .................. 280/489; 280/483; 280/484; 280/485; 280/486
(58) Field of Classification Search ................ 280/489, 280/483–486
See application file for complete search history.

(56) References Cited

U.S. PATENT DOCUMENTS

| | | | | |
|---|---|---|---|---|
| 4,641,852 A | * | 2/1987 | Kerst et al. ................... | 280/489 |
| 4,792,154 A | * | 12/1988 | Kerst et al. ................... | 280/489 |
| 5,851,021 A | | 12/1998 | Van Kley ................. | 280/438.1 |
| 6,170,849 B1 | | 1/2001 | McCall ........................ | 280/433 |
| 6,494,478 B1 | * | 12/2002 | MacKarvich ................ | 280/489 |
| 6,601,867 B2 | * | 8/2003 | Carty .......................... | 280/483 |
| 6,698,785 B2 | * | 3/2004 | Peters ......................... | 280/489 |
| 6,913,276 B1 | | 7/2005 | Bauder ........................ | 280/483 |
| 6,957,825 B2 | * | 10/2005 | Peters ......................... | 280/483 |
| 6,986,524 B2 | | 1/2006 | Heitzmann .................. | 280/433 |
| 7,152,870 B2 | * | 12/2006 | Gurtler ........................ | 280/483 |
| 2004/0169348 A1 | | 9/2004 | Winckler ................. | 280/425.2 |
| 2004/0227326 A1 | * | 11/2004 | Peters ......................... | 280/489 |
| 2005/0263984 A1 | * | 12/2005 | Gurtler ........................ | 280/489 |

* cited by examiner

*Primary Examiner*—Lesley Morris
*Assistant Examiner*—Michael R Stabley
(74) *Attorney, Agent, or Firm*—J. A. Thurnau, Esq.; J. L. Mahurin, Esq.; P. N. Dunlap, Esq.

(57) ABSTRACT

A pin box assembly comprising a first portion, a second portion, a connective member disposed between the first portion and the second portion, the first portion comprising a torque portion, the torque portion comprising a bar disposed within a tube and at least one resilient member disposed between the bar and the tube, the bar fixedly connected to the first portion, the tube fixedly connected to the second portion, the resilient member compressible between the bar and the tube upon rotation of the bar with respect to the tube, a connective member fixedly connected to the tube and to the second portion, and a hitch member connected to the first portion for engaging a hitch on a towing vehicle.

3 Claims, 2 Drawing Sheets

PIN BOX ASSEMBLY

FIELD OF THE INVENTION

The invention relates to a pin box assembly, and more particularly, to a pin box assembly comprising a torque portion for damping forces between a towing vehicle and a towed vehicle.

BACKGROUND OF THE INVENTION

There are available numerous types of fifth wheel pin box assemblies wherein a pin on the towed vehicle is inserted into a receptacle (fifth wheel) on the towing vehicle for coupling the two vehicles. However, insofar as known, prior fifth wheel pin box assemblies did not have any structure associated with them which would permit appreciable cushioned substantially rotational movement which could cushion the connection between the two vehicles.

Representative of the art is U.S. Pat. No. 6,986,524 B2 which discloses a fifth wheel pin box assembly for towing a trailer behind a towing vehicle including a column, a top member secured to the column, a rubber shear spring, a first plate on the rubber shear spring attached to the top member, a skid pad, a second plate on the rubber shear spring attached to the skid pad, a rubber member bonded between the first and second plates, and a pin extending downwardly from the skid pad.

Reference is also made to Torflex® suspension axles by the Dexter Axle Company which teaches a torsion arm suspension having rubber cords disposed in a torque tube see www-.dexteraxle.com/torflex_axles/.

What is needed is a pin box assembly comprising a torque portion for damping forces between a towing vehicle and a towed vehicle. The present invention meets this need.

SUMMARY OF THE INVENTION

The primary aspect of the invention is to provide a pin box assembly comprising a torque portion for damping forces between a towing vehicle and a towed vehicle.

Other aspects of the invention will be pointed out or made obvious by the following description of the invention and the accompanying drawings.

The invention comprises a pin box assembly comprising a first portion, a second portion, a connective member disposed between the first portion and the second portion, the first portion comprising a torque portion, the torque portion comprising a bar disposed within a tube and at least one resilient member disposed between the bar and the tube, the bar fixedly connected to the first portion, the tube fixedly connected to the second portion, the resilient member compressible between the bar and the tube upon rotation of the bar with respect to the tube, a connective member fixedly connected to the tube and to the second portion, and a hitch member connected to the first portion for engaging a hitch on a towing vehicle.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
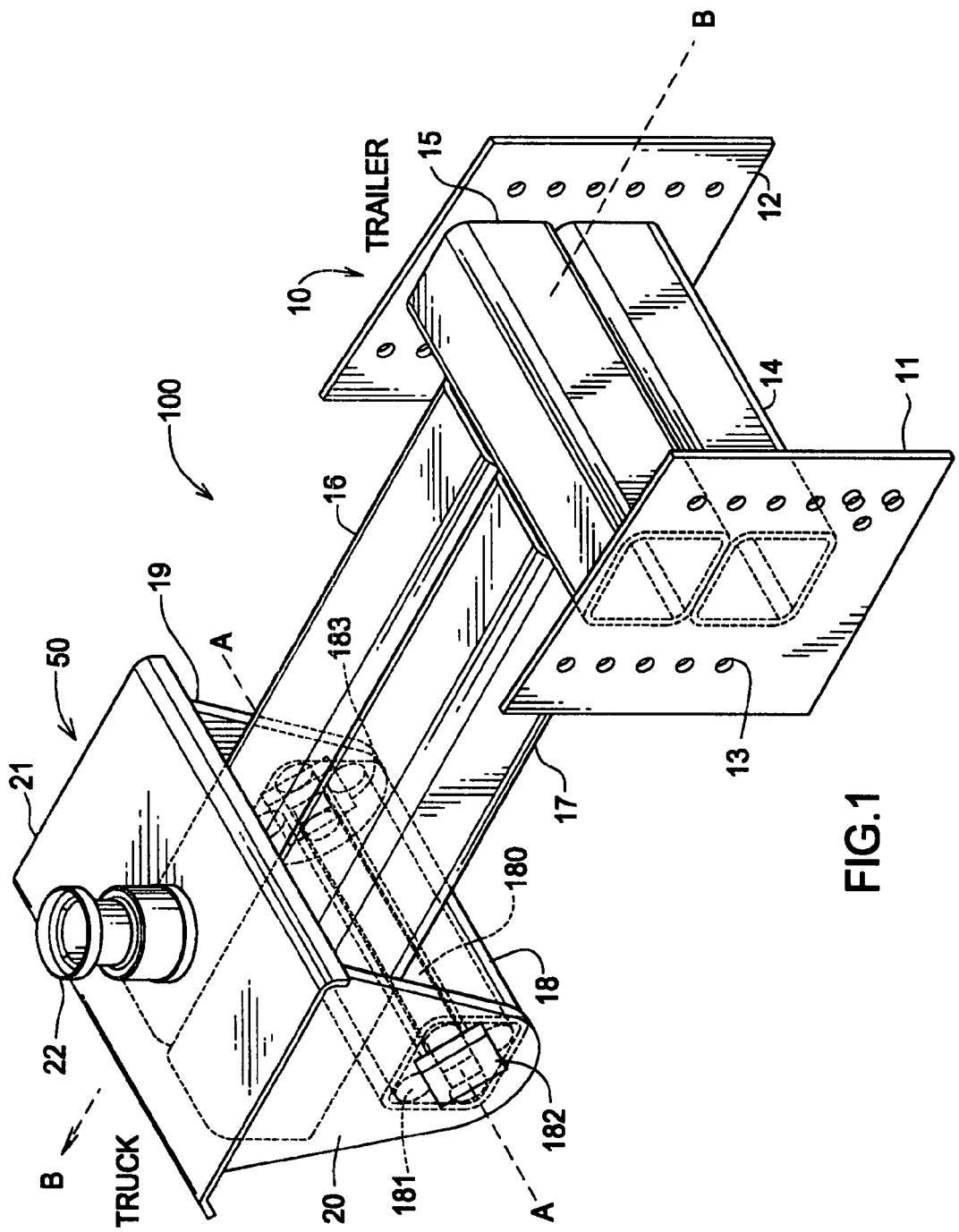
FIG. 1 is a perspective view from below of the inventive pin box assembly.

FIG. 1 is a perspective view from below of the inventive pin box assembly. The inventive pin box 100 comprises a first or towed vehicle portion 10 and a second or towing vehicle portion 50. For ease of illustration pin box 100 in FIG. 1 is shown from below giving the perspective from a fifth wheel hitch looking upward, that is, the view in FIG. 1 is of the underside of the pin box.

The towed vehicle portion 10 comprises a plate 11 and plate 12. Plate 11 and plate 12 are substantially parallel. Holes 13 are disposed in each plate 11, 12. Holes 13 are used to attach plates 11, 12 to a towed vehicle chassis, for example a trailer, see FIG. 2, using fasteners, for example, bolts. Transverse members 14, 15 are connected to each plate 11, 12. It is preferable that members 14, 15 be welded to each plate 11, 12. Tubes 14, 15 may be any shape suitable for the service. Tubes 14, 15 as shown in FIG. 1 are substantially rectangular in cross section.

Connective members 16, 17 are disposed between and are connected to transverse member 15 and to torque tube 18. Connective members 16, 17 are preferably welded to member 15 and to torque tube 18. Connective members 16, 17 are substantially parallel to each other, but may have any suitable configuration required by a vehicle design. Connective members 16, 17 are adjacent to each other along a major axis B-B of torque tube 18. Connective members 16, 17 may be replaced by a single connective member, or a plurality of connective members with equal success.

Towing vehicle portion 50 comprises torque tube 18 disposed between plates 19, 20. Also spanning between plates 19, 20 is hitch plate 21. Torque tube 18, plates 19 and 20, and hitch plate 21 are welded together in a manner known in the art.

Hitch pin 22 is mounted on hitch plate 21. Hitch pin 22 engages a fifth wheel hitch on a towing vehicle, for example, a truck, see FIG. 2.

Torque tube 18 further comprises a torque bar 180 which is contained within a torque tube 18. Torque bar 180 extends along an axis A-A. Torque bar 180 has a substantially rectangular cross section. Ends 182, 183 of torque bar 180 are fixedly connected, preferably by welding, to plates 19, 20 respectively. Torque tube 18 is rotationally moveable with respect to plates 19, 20 and with respect to torque bar 180.

Contained within torque tube 18 between plates 19, 20 and adjacent to torque bar 180 are resilient members 181. Resilient members 181 are captured within spaces between rectangular torque bar 180 and torque tube 18. The resilient members comprise an elastomeric material such as natural rubber or synthetic rubber, or a combination of the two or their equivalents. Resilient members 181 are compressed between the torque bar 180 and torque tube 18. Resilient members 181 have a substantially uniform diameter along the length of each.

The modulus range for each resilient member is approximately 1000 lbs. to approximately 8000 lbs. The modulus is the measure of the force required to compress a length of a resilient member that is equal to 4 times the diameter (length=4×diameter), to half of its original diameter (0.5 diameter).

The modulus test is performed using a Baldwin Tensile Tester or a machine with equivalent capability. The ambient temperature is maintained at approximately 23±2° C. (73.4±3.6° F.). The resilient member test specimen is kept at the noted temperature condition for a minimum of 3 hours prior to the time of testing.

The inventive pin box assembly damps transient load forces caused by vehicle movement during driving that are continuously transmitted between a towing vehicle and a towed vehicle.

Figure 2:
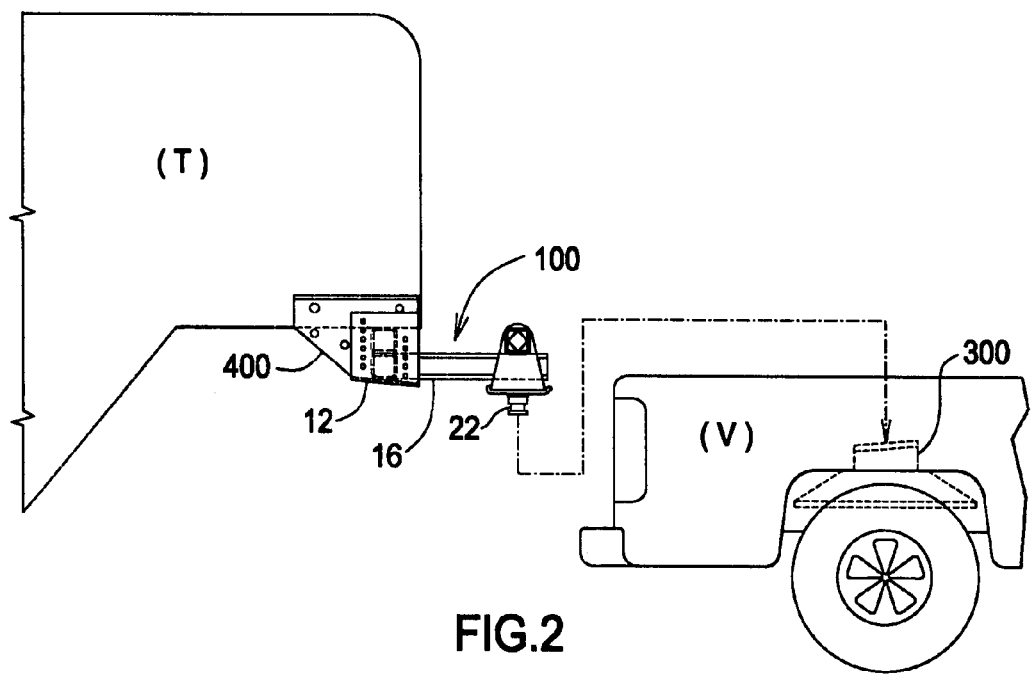
FIG. 2 is a side view of the inventive pin box assembly on a vehicle.

FIG. 2 shows that no static torque can be applied to the torque portion when it is hitched to a non-moving towing vehicle since the torque bar 180 is vertically aligned with the hitch pin 22 through connective members 16, 17.

In operation, a force transmitted from the towed vehicle portion 10 via connective members 16, 17 to torque bar 180 is absorbed by the resilient members 181. Resilient members 181 are arranged around torque bar 180 and captured in a fixed compressed state within torque tube 18. The length of the resilient members is dependent on the torque load capacity requirement.

Vehicle movement causes portion 50, i.e. plates 19, 20 to rotate slightly about torque bar 180 axis A-A since hitch pin 22 is fixedly engaged with a fifth wheel hitch on a towing vehicle. The fifth wheel hitch typically has some rotational movement capability which facilitates rotation of torque bar 180. The amount of rotation of portion 50 is proportional to the modulus of the resilient members 181. A stiffer (higher modulus) resilient member 181 will increase the torque required to rotate portion 50 a given angular amount. A less stiff (lower modulus) resilient member 181 will reduce the torque required to rotate portion 50 and therefore allow more freedom of rotation for portion 50 in response to a load input, for example during braking.

The response to a given torque determines the capacity of the inventive pin box assembly to absorb a load input. Absorbing a load input through the inventive assembly reduces the wear and damage that can be caused to a hitch assembly, towing vehicle and towed vehicle during normal use. The pin box can be adjusted to suit the towing needs of a variety of trailers of different weights.

FIG. 2 is a side view of the inventive pin box assembly on a vehicle. The inventive pin box assembly is connected to the chassis of a towed vehicle (trailer T). Plates 11, 12 are connected to a trailer chassis plate 400 by welding or by bolts.

Hitch pin 22 engages a fifth wheel hitch 300 mounted to a towing vehicle (V). The fifth wheel hitch is known in the art.

Figure 3:
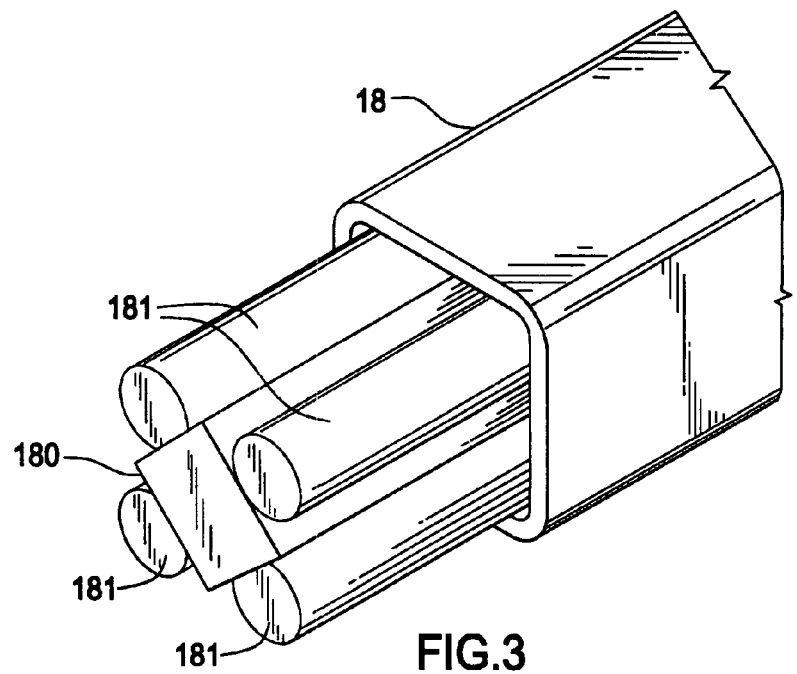
FIG. 3 is a detail of the torque tube and torque bar.

FIG. 3 is a detail of the torque tube and torque bar. Four resilient members 181 are shown arranged around the rectangular torque bar 180. Torque bar 180 and resilient members 181 are disposed within torque tube 18.

In operation a force is transmitted via connective members 16, 17, to the torque tube 18. Torque tube 18 rotates with respect to torque bar 180. The rotation is damped by the four resilient members 181 which are captured in a fixed compressed state between the torque bar 180 and the torque tube 18. Compression of the resilient members 181 absorbs and dissipates the forces moving between the trailer (T) and a towing vehicle (V) during normal operation.

Although a form of the invention has been described herein, it will be obvious to those skilled in the art that variations may be made in the construction and relation of parts without departing from the spirit and scope of the invention described herein.

I claim:

1. A pin box assembly comprising:
   a first portion (10) connected to a towed vehicle;
   a second portion (50) for connecting to a towing vehicle;
   a connective member disposed between the first portion and the second portion;
   the first portion comprising a torque portion, the torque portion comprising a bar disposed within a tube and at least one resilient member disposed between the bar and the tube;
   the bar fixedly connected to the second portion, the tube fixedly connected to the first portion;
   the resilient member compressible between the bar and the tube upon rotation of the bar with respect to the tube;
   a connective member fixedly connected to the tube and to the first portion;
   wherein no static torque is applied to the torque portion; and
   a hitch member connected to the second portion for engaging a fifth wheel receiver on a towing vehicle.

2. The pin box assembly as in claim 1, wherein:
   the tube has a substantially rectangular cross-section;
   the bar has a substantially rectangular cross-section; and
   a plurality of resilient members are disposed between the bar and the tube.

3. The pin box assembly as in claim 1, wherein the hitch member further comprises a pin to engage a towing vehicle hitch.

\* \* \* \* \*